Dec. 8, 1925.
T. F. GALLIGAN
1,564,663
GLARE GUARD FOR EYEGLASSES
Filed April 18, 1924   3 Sheets-Sheet 1
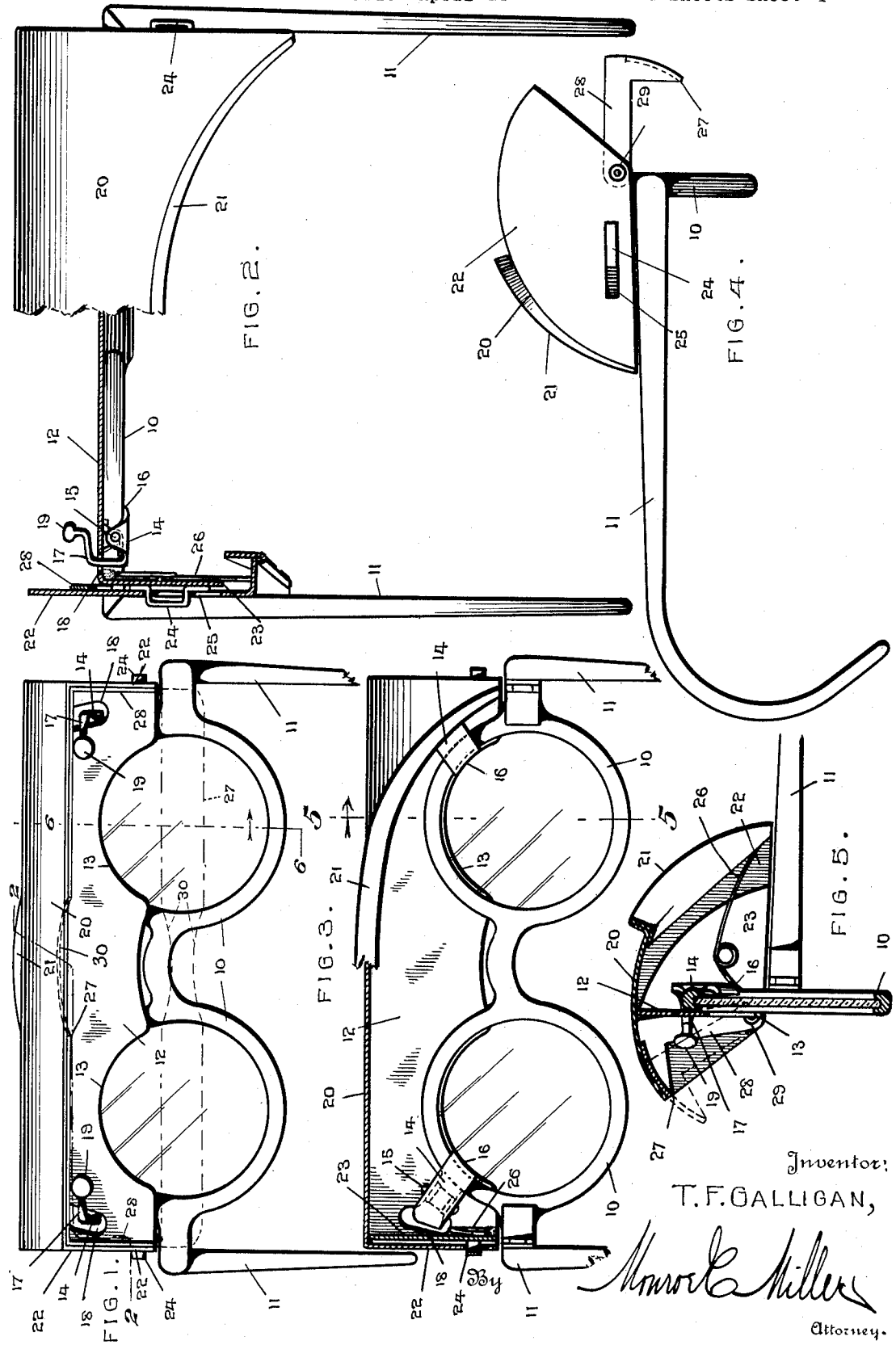
Inventor:
T. F. GALLIGAN,
Attorney.

Dec. 8, 1925.
T. F. GALLIGAN
1,564,663
GLARE GUARD FOR EYEGLASSES
Filed April 18, 1924   3 Sheets-Sheet 2
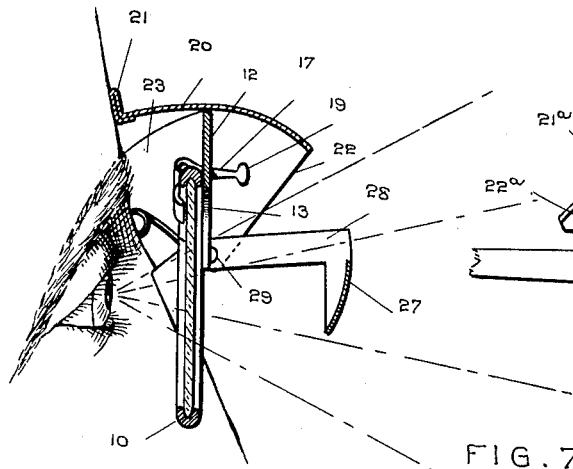
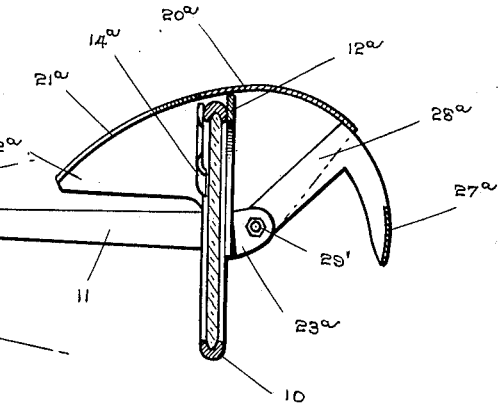
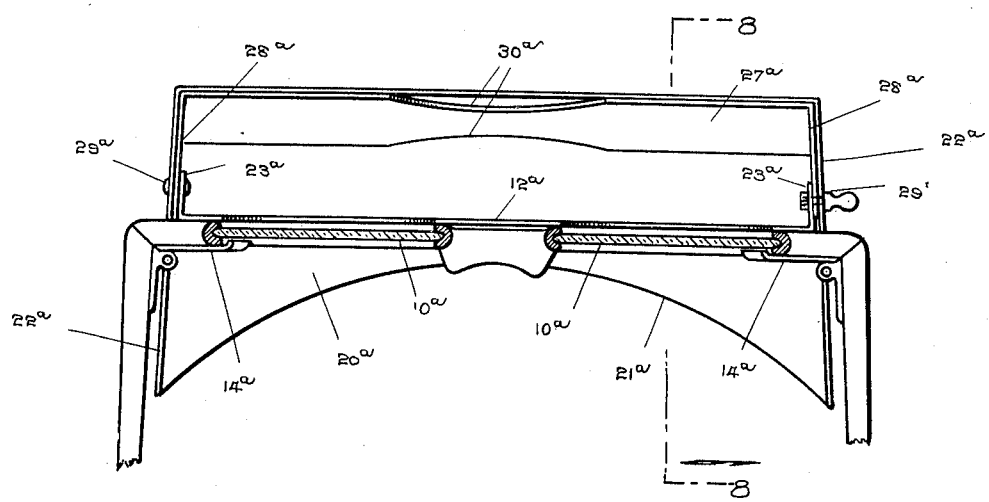
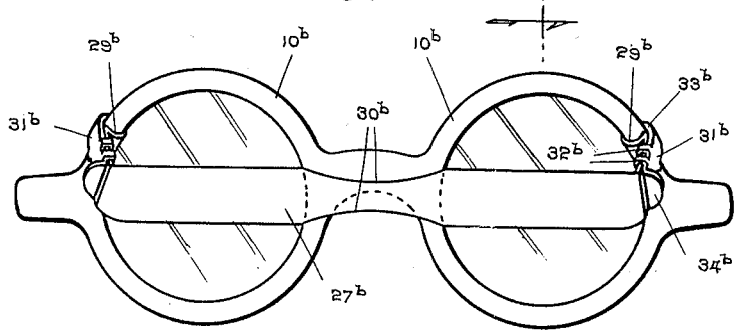
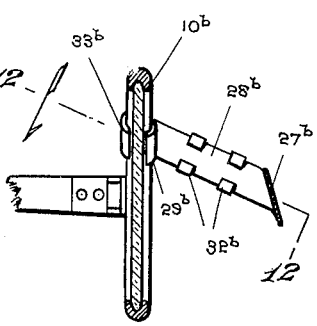
Inventor:
T. F. GALLIGAN,
By Monroe E. Miller
Attorney Dec. 8, 1925.
T. F. GALLIGAN
1,564,663
GLARE GUARD FOR EYEGLASSES
Filed April 18, 1924   3 Sheets-Sheet 3
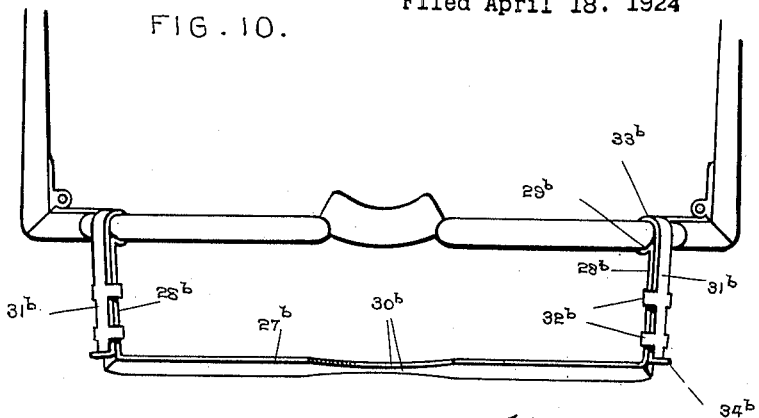
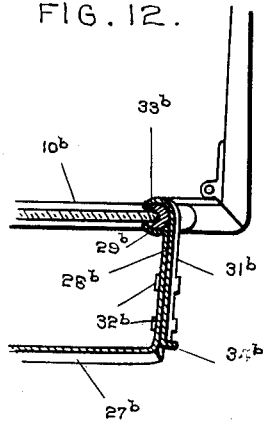
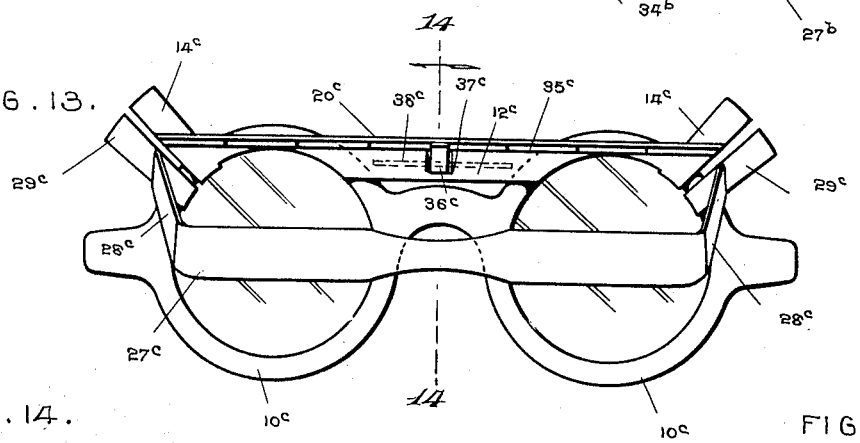
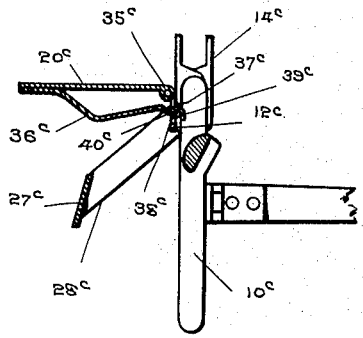
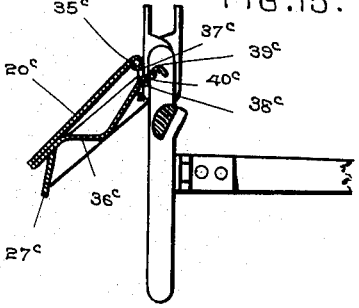
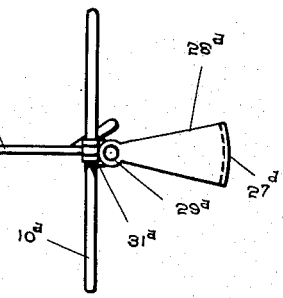
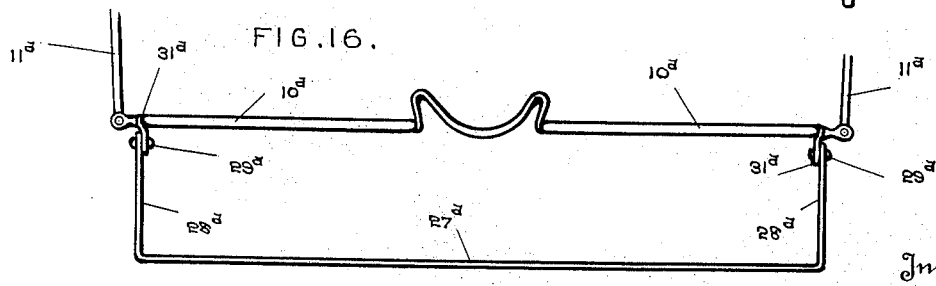
Inventor:
T. F. GALLIGAN,
By Monroe E. Miller
Attorney.

Patented Dec. 8, 1925.

1,564,663

UNITED STATES PATENT OFFICE.

THOMAS F. GALLIGAN, OF PHILADELPHIA, PENNSYLVANIA.

GLARE GUARD FOR EYEGLASSES.

Application filed April 18, 1924. Serial No. 707,427.

*To all whom it may concern:*

Be it known that I, THOMAS F. GALLIGAN, a citizen of the United States, residing at Philadelphia, in the county of Philadelphia and State of Pennsylvania, have invented certain new and useful Improvements in Glare Guards for Eyeglasses, of which the following is a specification, reference being had therein to the accompanying drawing.

The present invention relates to glare guards for protecting and shielding the eyes from strong light, and aims to provide a novel and improved guard or protector to shut off from the eyes light rays coming from different directions and angles, either above or below the line of vision, so as to avoid objectionable glare and to improve the vision.

Another object of the invention is the provision of an adjustable guard member to be disposed in front of the eyes, below or above the line of vision, to protect the eyes from strong light directed toward the eyes from near the line of vision.

A further object is the provision of a glare guard having a vizor or top shade construction which is adjustable to accommodate the forehead of the wearer when carried by eyeglasses.

A still further object is the provision of novel means for removably supporting the guard from eyeglasses.

The invention has for a further object the combination of the front guard member with the vizor whereby the front guard member can be moved out of the way and can also be used as an extension for the forward edge of the vizor.

Still another object is the provision of a device of the character indicated comprising a novel construction and assemblage of the component elements, to enhance the utility and efficiency of the device, and to enable the device to meet various requirements.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1 is a front view of the glare guard as mounted on the frame of a pair of eyeglasses, showing the front guard member in position in dot and dash lines.

Fig. 2 is a view, partly in plan, and partly in section on the line 2—2 of Fig. 1.

Fig. 3 is a rear view, portions being broken away and shown in section.

Fig. 4 is a side elevation of the device showing the front guard member in position in front of the eyeglasses.

Fig. 5 is a section on the line 5—5 of Fig. 3, showing in dotted lines, the front guard member serving as an extension for the front edge of the vizor.

Fig. 6 is a vertical section on the line 6—6 of Fig. 1 with the front guard member in position in front of the eyes, and showing the guard as in use.

Fig. 7 is a bottom plan view of a modified construction of glare guard, showing the eyeglasses and frame in section.

Fig. 8 is a section on the line 8—8 of Fig. 7.

Fig. 9 is a front view showing another form of front guard member attached to the frame of a pair of eyeglasses.

Fig. 10 is a plan view of the device shown in Fig. 9.

Fig. 11 is a section on the line 11—11 of Fig. 9.

Fig. 12 is a section on the line 12—12 of Fig. 11.

Fig. 13 is a front view of the front and top guard members constituting separate units attached to the frame of the eyeglasses.

Fig. 14 is a section on the line 14—14 of Fig. 13 showing the top guard member or vizor in raised position.

Fig. 15 is a section on the same line as Fig. 14 showing the top guard member or vizor swung down against the front guard member.

Fig. 16 is a plan view showing a front guard member having a permanent hinge connection with the frame of the eyeglasses.

Fig. 17 is a side elevation of the device as shown in Fig. 16.

The device can be made in different sizes and shapes to suit different frames of eyeglasses and to accommodate different persons. As shown, the frame has the rims or bows 10 and the temples or ear engaging hooks 11.

The device has a vertical supporting plate 12 disposed in front of and extending upwardly from the upper portions of the rims 10, said plate being cut away, as at 13, to conform to the upper portions of the rims 10, without obstructing the vision. Said plate 12 serves as a support for other parts of the guard, and also provides a barrier against the passage of stray light rays over the glasses or lenses.

The plate 12 carries means for detachably fastening it to the frame of the eyeglasses, and, as shown, such means comprises clasps 14 disposed in rear of the plate 12 adjacent to the ends thereof, and connected by spring hinges 15 with said plate. The clasps 14 have jaws 16 so formed as to engage partly around the rims 10, whereby to clamp the plate 12 against said rims, and retain said plate in proper position.

To facilitate the opening of the clasps for the application of the device to and the removal thereof from the frame of the eyeglasses, the clasps 14 have arms 17 projecting forwardly from those ends opposite to the jaws 16 and projecting through openings or slots 18 provided in the plate 12. The arms 17 have knobs 19 at their forward ends in front of the plate 12 for the convenient engagement of the fingers to swing the clasps so as to move the jaws 16 rearwardly away from the plate 12, the spring hinges 15, which are of any suitable or well known kind such as used in necktie clasps, serving to swing the jaws 16 toward the plate 12 to clamp the rims 10 between said jaws and plate. When the knobs 19 are pressed toward the plate 12, said knobs and plate being moved toward one another between the thumbs and fingers of the two hands, the clasps are opened, and the device can be readily attached to or removed from the frame of the eyeglasses.

Extending over the upper edge of the supporting plate 12 is a curved vizor or shade 20, the rear edge of which is curved to conform to the forehead of the wearer, and said vizor preferably has a broad flange 21 along said rear edge to bear comfortably against the forehead. The vizor 20 has the sides 22 for shutting off stray light rays from the opposite sides, while the vizor itself arrests light rays from above.

The vizor 20 and supporting plate 12 are formed from suitable thin opaque material, which is light in weight although sufficiently strong to hold its shape.

The vizor 20 is slidable forwardly and rearwardly over the plate 12 in order to be adjustable to accommodate the forehead of the wearer. Thus, the plate 12 is provided at its ends with rearwardly extending wings 23 across which the sides 22 of the vizor extend, and said sides 22 bear slidably against said wings. The wings 23 have outstanding guide members 24 secured thereto working in horizontal slots 25 provided in the sides 22, whereby the vizor is guided for forward and rearward motion on the supporting plate.

The vizor 20 is moved rearwardly yieldingly relatively to the plate 12, by means of suitable springs. As shown, wire springs 26 are disposed at the inner sides of the sides 22 and wings 23 and have their ends soldered or otherwise secured to said sides and wings. The springs 26 move the vizor 20 rearwardly, but enable the vizor to move yieldingly forward when the frame of the eyeglasses is put on, so that the device will adjust itself to the forehead. In other words, the flange 21 bears against the forehead, and the plate 12 can move relatively to the vizor 20 rearwardly, so that the vizor is retained in its proper position relatively to the forehead, while the eyeglasses are adjusted to the eyes, the eyeglasses and plate 12 being movable forwardly and rearwardly under the vizor.

In addition to the vizor or shade 20 comprising a top guard member, there is provided a forward guard member 27, which is opaque and of suitable width. Said guard member 27 is elongated to extend across the eyes and glasses, and has the arms 28 at its ends for supporting said front guard member. In order to support the guard member 27 for upward and downward adjustment, the arms 28 are pivoted, by rivets 29 or other pivot elements, to the sides 22 of the vizor or top guard member 20, with the arms 28 overlapping the inner surfaces of said sides 22. The member 27 is curved so as to move snugly under the vizor 20 when said member 27 is swung upwardly, thereby positioning the front guard member out of the way under the vizor, when said member 27 is not in use. The frictional engagement of the member 27 and arms 28 with the top and sides of the vizor 20 holds the member 27 in position, assisted by the friction of the pivots 29. The member 27 can be projected beyond the forward edge of the vizor 20, as shown in dotted lines in Fig. 5, so that said member forms an extension for the forward edge of the vizor.

A chief advantage of the member 27 resides in the fact that it can be adjusted upwardly and downwardly in front of the eyes, as suggested in Fig. 6. The member 27 can be positioned at different distances below the vizor 20, in order to shut off strong light rays from in front of the eyes, vision being had either over or under the member 27. Said member can also be adjusted down further so as to cut off light rays from below the line of vision such as when light is reflected upwardly toward the eyes. In fact, the member 27 can be positioned anywhere between the lower portions of the eyeglasses and the vizor.

The vizor shuts off stray light rays from above and from the sides, while the front guard member 27 can shut off light rays from either above or below the line of vision, so that vision will be less hazy. The member 27 can be so positioned as to protect the eyes, without interfering with forward vision, but, to the contrary, improving the vision and bringing out objects more clearly.

The guard can be readily attached to and detached from the frames of different eyeglasses, and the guard also protects the eyes from glare and meets the requirements of the wearer. The guard member 27 can have its upper and lower edges straight, the same as the forward edge of the vizor 20, but, it is preferable to form the upper and lower edges of said member 27 between the ends thereof with the cut-away portions 30, which improve vision under certain conditions.

Figs. 7 and 8 show a modified construction. The vertical supporting plate $12^a$ is detachably secured by means of clasps $14^a$ to the frame of the eyeglasses, and the vizor or top shade $20^a$ has its rear edge curved, as at $21^a$, to conform to the forehead. The plate $12^a$ has the forwardly extending ears $23^a$ at its ends, to which the sides $22^a$ of the vizor are pivoted, as at $29^a$ and $29'$, the pivot $29'$ being a bolt or screw which can be loosened and tightened for holding the vizor in different angular positions when tilted forwardly or rearwardly. Thus, when the pivot $29'$ is loosened, the vizor $20^a$ can be swung about the pivots over the plate $12^a$, thus providing a hinged adjustment instead of a sliding adjustment as in the first form of device. The pivots $29^a$ and $29'$ also support the arms $28^a$ of the front guard member $27^a$ for the upward and downward adjustment of said member $27^a$. The arms $28^a$ are held between the ears $23^a$ and sides $22^a$ of the vizor, and the adjustment of the front guard member is the same as in the first form. Thus, both the vizor and front guard member are adjustable about the pivots independently of one another. The member $27^a$ is also shown as having the cut-away portions $30^a$.

Figs. 9, 10, 11 and 12 illustrate a front guard member $27^b$ used without the vizor or top guard member. The member $27^b$ has the rearwardly extending arms $28^b$ formed at their rear ends with the curved seats or portions $29^b$ to fit the bows $10^b$ of the frame of the eyeglasses. Slides $31^b$ are disposed at the outer sides of the arms $28^b$ and have hooks $32^b$ engaging around the edges of the arms $28^b$ to slidably connect said slides and arms, and the rear ends of said slides are bent into hooks $33^b$ to engage in back of the bows $10^b$. The slides $31^b$ have outturned finger pieces $34^b$ at their forward ends for convenience in moving the slides $31^b$ on the arms $28^b$. When the slides $31^b$ are slid rearwardly on the arms $28^b$, the hooks $32^b$ are moved away from the portions $29^b$ so that the member $27^b$ can be readily applied to or removed from the frame of the eyeglasses, and when the slides $31^b$ are slid forwardly on the arms the hooks $32^b$ and portions $29^b$ will embrace the bows $10^b$ and support the member $27^b$ in front of the eyeglasses. As shown, the member $27^b$ has the cut-away portions $30^b$.

Figs. 13, 14 and 15 show the front and top guard members as constituting separate units whereby either unit can be used separately or both of them used at the same time. The front guard member $27^c$ has the rearwardly extending arms $28^c$ secured to clasps $29^c$ which are engageable with the bows $10^c$, thus providing a convenient means for attaching said member to and detaching it from the frame of the eyeglasses. The ends of the supporting plates $12^c$ of the top guard member or vizor $20^c$ are connected to clasps $14^c$ to engage with and disengage from the bows $10^c$ above the clasps $29^c$. The vizor or top guard member $20^c$ is hinged, as at $35^c$, to the plate $12^c$, to swing upwardly and downwardly, as seen in Figs. 14 and 15, to cut off more or less light above the front guard member $27^c$.

In order to hold the vizor $20^c$ in raised and lowered, or open and closed positions, the rearwardly extending leaf spring $36^c$ is secured to the lower surface of the vizor, and projects through an opening $37^c$ with which the plate $12^c$ is formed, said spring extending across and bearing on a rod $38^c$ secured to the rear side of the plate $12^c$ and extending across the opening $37^c$. The spring $36^c$ has the hook $39^c$ to engage over the rod $38^c$ when the vizor $20^c$ is swung upwardly, to limit the upward or opening movement of said vizor, and the spring has a depending lug $40^c$ immediately in front of the hook to engage in front of the rod $38^c$ for holding the vizor in raised position. Said lug snaps in rear of the rod $38^c$ when the vizor is swung downwardly, as seen in Fig. 15, so that the leaf spring in bearing down on the rod $38^b$ will hold the vizor in either raised or lowered positions.

Figs. 16 and 17 show a front guard member $27^d$ having a permanent hinge connection with the frame of the eyeglasses, which, as shown, is a metal frame. Thus, the arms $28^d$ of the member $27^d$ are pivoted by rivets $29^d$ with ears or pieces $31^d$ soldered or otherwise secured to the opposite portions of the bows $10^d$, and which pieces can also serve as parts of the hinges for the temples $11^d$. The guard member $27^d$ is thus permanently carried by the frame and can be swung upwardly and downwardly in front of the eyeglasses between the upper and lower portions of the bows.

Having thus described the invention, what is claimed as new is:—

1. A glare guard member to be disposed in front of the eyes and being of a width vertically to protect the eyes from light rays coming from in front of the eyes, said member permitting of vision above and below same when disposed in front of the eyes, and means for supporting said member in front of the eyes for the bodily upward and downward adjustment of said member to raise and lower both the upper and lower edges of said member.

2. In combination with a pair of eyeglasses, of a glare guard member to be disposed in front of the eyes and of a vertical width to protect the eyes from light rays coming from in front of the eyes, said member permitting of vision above and below same through the eyeglasses when positioned in front of the eyes, and means supporting said member from the eyeglasses for bodily upward and downward adjustment to raise and lower both the upper and lower edges of said member.

3. In combination with a pair of eyeglasses, of a glare guard member to be disposed in front of the eyes and of a vertical width to protect the eyes from light rays coming from in front of the eyes, said member permitting of vision above and below same through the eyeglasses when positioned in front of the eyes, and means hingedly connecting said member with the eyeglasses for the bodily upward and downward adjustment of said member in front of the eyes to raise and lower both the upper and lower edges of said member.

4. A glare guard comprising a curved vizor to be disposed over the eyes, and a front guard member hingedly connected with the vizor to be disposed in front of the eyes below the vizor, and adapted to be moved under the vizor along the curved portion thereof.

5. A glare guard comprising a vizor to be disposed over the eyes, a front guard member, and an adjustable connection between said vizor and member mounting said member for forward and downward edgewise movement to a position below and spaced different distances from the vizor in front of the eyes for vision over said member below the vizor, and for reverse edgewise movement upwardly and rearwardly into overlapping relation with the vizor with the forward edge portion of said member retracted behind or projecting different distances beyond the forward edge of the vizor, said member being of a width vertically to protect the eyes from light rays coming from in front of the eyes when said member is in the firstnamed position.

6. A glare guard comprising a vizor to be disposed over the eyes, a guard member, and an adjustable connection between said member and vizor mounting said member for edgewise movement forwardly and rearwardly while in overlapping relation with the vizor in order that the forward edge portion of said member may be retracted behind or projected different distances beyond the front edge of the vizor while said member and vizor are overlapped.

7. The combination with a pair of eyeglasses, of an elongated glare guard member to be disposed horizontally in front of the eyes and of a length to extend across both eyeglasses, said member being of a vertical width to protect the eyes from light rays coming from in front of the eyes, and said member permitting of vision above and below same through the eyeglasses when positioned in front of the eyes, and means for supporting said member from the eyeglasses with said member spaced forwardly from the eyeglasses.

8. The combination with a pair of eyeglasses, of a vizor at the upper edges thereof, a glare guard member in front of the eyeglasses, said member being of a vertical width to protect the eyes from light rays coming from in front of the eyes, said member permitting of vision above and below same through the eyeglasses when positioned in front of the eyes, and means supporting said vizor and member from the eyeglasses to position said member in front of the eyes with a space between the vizor and member to permit vision between them, or to bring said vizor and member together.

9. A glare guard comprising in combination with eyeglasses a vizor to bear against the forehead, and a mounting adjustably supporting the vizor from the eyeglasses and including spring means for yieldingly moving the vizor rearwardly relatively to the eyeglasses to press the vizor against the forehead when the eyeglasses are worn.

10. A glare guard comprising in combination with eyeglasses a vizor adapted to bear against the forehead, means supporting the vizor from the eyeglasses for forward and rearward movement relatively to the glasses, and spring means for yieldingly moving the vizor rearwardly relatively to the glasses.

11. A glare guard comprising in combination with a pair of eyeglasses an upstanding supporting plate attached to the rims of the eyeglasses so as to extend across and upwardly from both rims, and a single vizor over both eyeglasses and extending over and adjustably supported by said plate.

12. A glare guard comprising in combination with a pair of eyeglasses an upstanding supporting plate attached to the rims of the eyeglasses so as to extend across and upwardly from both rims, a vizor disposed over both eyeglasses and extending over and adjustably supported by said plate for forward and rearward movement relatively to said plate, and spring means for yieldingly moving the vizor rearwardly relatively to said plate.

13. A glare guard comprising a supporting plate having means for attachment to eyeglass rims, a vizor extending over and slidably supported from said plate for forward and rearward movement, and spring means for yieldingly moving the vizor rearwardly relatively to said plate.

14. A glare guard comprising in combination with a pair of eyeglasses an upstanding plate attachable to the frame of the eyeglasses to extend upwardly from the eyeglasses, and having angularly extending wings at its ends, and a vizor extending over said plate and having sides overlapping and adjustably connected with said wings for the forward and rearward movement of the vizor relatively to said plate.

15. A glare guard comprising a supporting plate attachable to the rims of eyeglasses, and having wings at its ends, a vizor extending over said plate and having sides slidably connected with said wings, and spring means for yieldingly moving the vizor rearwardly relatively to said plate.

16. A glare guard comprising a vertical plate having means for attaching it to the rims of eyeglasses, a vizor extending over said plate and having its rear edge formed to bear against the forehead, the vizor having sides slidably connected with said plate for forward and rearward motion, and spring means for moving the vizor rearwardly relatively to said plate.

In testimony whereof I hereunto affix my signature.

THOMAS F. GALLIGAN.